United States Patent

[11] 3,624,455

| [72] | Inventor | Melvin W. Hillman<br>P. O. Box 1186, Hobe Sound, Fla. 33455 |
|---|---|---|
| [21] | Appl. No. | 67,744 |
| [22] | Filed | Aug. 28, 1970 |
| [45] | Patented | Nov. 30, 1971 |

[54] SIGNAL-COMPARING SYSTEM, PARTICULARLY FOR TEMPERATURE-SENSING
25 Claims, 2 Drawing Figs.

[52] U.S. Cl........................................................ 317/132,
236/78, 307/235, 317/133.5, 317/DIG. 5, 323/22 T, 323/40
[51] Int. Cl.........................................................H01h 47/26
[50] Field of Search.......................................... 317/132,
146, DIG. 5, DIG. 1, 148.5, 153, 133, 133.5;
307/235, 240, 232, 310; 330/1, 9, 10; 328/146,
147; 236/74, 78; 323/22 T, 40; 219/499, 501

[56] References Cited
UNITED STATES PATENTS

| 2,835,450 | 5/1958 | Brown, Jr. et al............ | 317/133.5 X |
| 2,713,130 | 7/1955 | Weiller......................... | 317/132 |
| 2,836,639 | 5/1958 | Templin ....................... | 236/74 X |
| 2,892,916 | 6/1959 | Holmes ........................ | 317/132 X |
| 3,024,658 | 3/1962 | Huddleston, Jr. ............. | 330/9 X |

Primary Examiner—J. D. Miller
Assistant Examiner—Harry E. Moose, Jr.
Attorney—William J. Flynn ABSTRACT: A temperature-sensing system having a Thermistor in a Wheatstone bridge whose output is compared against a reference potentiometer. The two signals are applied through emitter followers to a chopper excited by an oscillator. A phase discriminator compares the amplified chopper output against the oscillator output. The phase discriminator controls the energization of a relay coil. A feedback circuit between the relay coil and the chopper increases the apparent difference between the two input signals to the chopper, so as to increase the apparent temperature error.

3,624,455

SIGNAL-COMPARING SYSTEM, PARTICULARLY FOR TEMPERATURE-SENSING

SUMMARY OF THE INVENTION

This invention relates generally to a system for comparing two DC signals, and more particularly to a temperature-sensing system in which one DC signal is proportional to the actual temperature and the other DC signal is proportional to a reference temperature.

One object of the present invention is to provide a novel and improved system for comparing two DC voltages in a chopper whose output is amplified by a high-gain AC amplifier and applied to a phase discriminator for determining which of the two DC voltages is the greater.

Another object of this invention is to provide such a system having a DC-to-DC converter including an oscillator which provides the excitation for the chopper and also provides an AC reference signal for the phase discriminator.

Another object of this invention is to provide a novel and improved system for comparing the output from a bridge against a reference potentiometer, with the bridge and the reference potentiometer being isolated from each other.

Another object of this invention is to provide a novel and improved system for comparing the output from a bridge against a reference signal, with the power supply input to the bridge being isolated from the power supply for the remainder of the system.

Another object of this invention is to provide a novel and improved temperature-sensing system having a novel feedback circuit for increasing the apparent temperature error by a predetermined amount, so as to enhance the error-correcting action of the system.

Further objects and advantages of this invention will be apparent from the following detailed description of a presently preferred embodiment with reference to the accompanying drawings.

Figure 1:
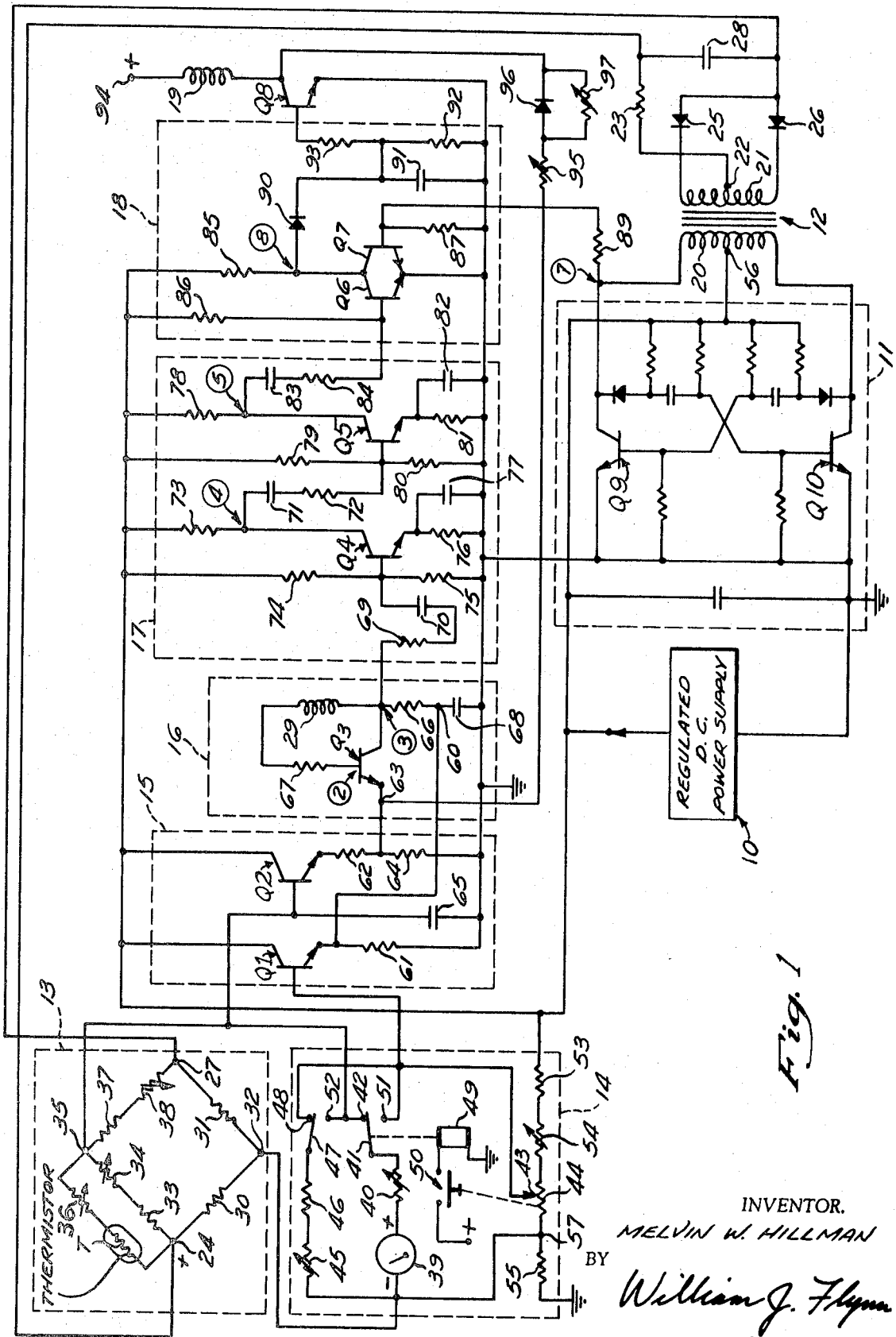
FIG. 1 is a schematic electrical circuit diagram of the present system.

Referring to FIG. 1, in broad outline the complete temperature-regulating system embodying the present invention comprises a regulated DC power supply 10, an oscillator 11, a transformer 12 energized by the oscillator, a Wheatstone bridge 13 including a thermistor T as a temperature-sensing element, a set-point reference circuit 14, an emitter follower amplifier 15 for isolating the bridge 13 from the potentiometer in the set-point reference circuit 14, a transistor chopper 16 driven from the transformer 12 and producing an output signal whose amplitude is proportional to the apparent error or difference signal between the Wheatstone bridge output and the set-point reference voltage, a high-gain AC amplifier 17 for amplifying the chopper output, a phase discriminator 18 for comparing the respective phases of the outputs from amplifier 17 and oscillator 11, and a control relay coil 19 connected to the output of the phase discriminator 18 and operable to control heating or cooling of the environment whose temperature is sensed by the thermistor in bridge 13.

In one practical embodiment, the oscillator 11 operates at a frequency of 10 kilocycles per second.

The primary winding 20 of transformer 12 is connected across the output terminals of the oscillator. The transformer has center-tapped secondary winding 21 which is inductively coupled to the primary winding 20. The center tap 22 on secondary winding 21 is connected through a resistor 23 to one input terminal 24 of the bridge 13. The upper and lower ends of this secondary winding are connected through respective rectifier diodes 25 and 26 to the opposite input terminal 27 of the bridge. A capacitor 28 is connected across the bridge input terminals 24 and 27.

Transformer 12 also has another secondary winding 29 which is inductively coupled to the primary winding 20 and is connected in the chopper 16 to energize the latter at the frequency of the oscillator 11.

The oscillator 11 is of conventional design, and it includes a pair of transistors Q9 and Q10 which conduct alternately. The upper end of the transformer primary winding 20 is connected to the collector of Q9. The lower end of the transformer primary winding is connected to the collector of Q10. A center tap 56 on the transformer primary winding 20 is connected directly to the positive terminal of the regulated DC power supply 10, which in one practical embodiment is at +8.5 volts.

In the half cycles of the oscillator when Q9 is conductive, the upper end of the transformer primary winding 20 is substantially grounded through the collector-emitter path of Q9. Consequently, the 8.5 volts now applied across the upper half of the transformer primary induces a current in the upper half of the transformer secondary winding 21 which flows from the center tap 22 on the latter through resistor 23 to input terminal 24 of bridge 13. The other input terminal 27 of the bridge is connected back to the upper end of the transformer secondary through the anode-to-cathode path in rectifier 25.

In the half cycles of the oscillator when Q10 is conductive, the lower end of the transformer primary winding 20 is substantially grounded through the collector-emitter path of Q10. Consequently, the 8.5 volts now applied across the lower half of the transformer primary induces a current in the lower half of the transformer secondary winding 21 which flows from the latter's center tap through resistor 23 to input terminal 24 of bridge 11. The other input terminal 27 of bridge 11 is connected back to the lower end of the transformer secondary through the anode-to-cathode path in rectifier 26.

From FIG. 1 it will be apparent that the positive terminal of power supply 10 is connected directly to the emitter follower section 15, the AC amplifier 17 and the phase discriminator 18 to provide the power supply for these portions of the circuit. However, the oscillator 11, the transformer 12 and rectifiers 25 and 26 constitute a DC-to-DC converter which isolates the Wheatstone bridge 13 from the power supply 10.

In addition, the transformer 12, through the inductive coupling between its primary winding 20 and its other secondary winding 29, provides the energization or excitation source for the chopper 16.

The Wheatstone bridge 13 has a first resistance branch comprising resistors 30 and 31 connected in series between its input terminals 24 and 27. A first output terminal 32 of the bridge is at the juncture between resistors 30 and 31.

A second resistance branch of the bridge comprises:
1. a fixed resistor 33 and an adjustable resistor 34 connected in series with each other between input terminal 24 and the other bridge output terminal 35;
2. a series-connected Thermistor T and adjustable resistor 36 connected across terminals 24 and 35 in parallel with the resistance path provided by series-connected resistors 33 and 34; and
3. a fixed resistor 37 and an adjustable resistor 38 connected in series with each other between the bridge output terminal 35 and the bridge input terminal 27.

The adjustable resistors 34 and 36 provide parallel and series compensation for the thermistor T, whose resistance is not precisely a straight-line function of temperature, so that there are four tracking adjustments, for the low end, lower midscale, upper midscale and high end of the temperature range. Resistor 38 is adjusted in accordance with the adjustments of resistors 34 and 36.

Normally, a microammeter 39, an adjustable resistor 40 and a set of normally closed, relay contacts 41, 42 are connected in series with each other across the bridge output terminals 32, 35. Resistor 40 is adjustable to provide the proper range on meter 39.

Also, normally the bridge output terminal 32 is connected to the adjustable contact 43 on a set-point potentiometer 44 through an adjustable resistor 45, a fixed resistor 46 and a set of normally closed relay contacts 47, 48. The combined resistance of resistors 45 and 46 is equal to the combined resistance of meter 39 and resistor 40.

Both mobile relay contacts 41 and 47 are controlled by a relay coil 49, which is connected across a suitable DC power source, such as a battery, when a normally open pushbutton switch 50 is closed. When relay coil 49 is energized, its mobile contact 41 closes on a normally open fixed contact 51 connected directly to potentiometer contact 43, and its mobile contact 47 closes on a normally open contact 52 connected directly to the bridge output terminal 35.

The potentiometer 44 is connected in series with a fixed resistor 53, an adjustable resistor 54 and a fixed resistor 55 across the regulated DC power supply 10.

With this arrangement, the voltage at the potentiometer tap 43 can be made equivalent to the output voltage of the bridge 13 at a particular temperature corresponding to the potentiometer setting. The junction point 57 between the lower end of potentiometer 44 and the ungrounded end of resistor 55 is connected directly to the negative terminal of meter 39, as well as to resistor 45 and the bridge output terminal 32.

Normally, with relay coil 49 deenergized, the meter 39 is connected across the output of the bridge 13, so that the meter reading corresponds to the temperature sensed by the thermistor T in the bridge.

When switch 50 is closed, however, the bridge output is disconnected from the meter and, due to the closing of relay contacts 47 and 52, is connected to the equivalent load circuit provided by resistors 45 and 46. At the same time, due to the closing of relay contacts 41 and 51, the meter 39 is connected to sense the voltage on the potentiometer tap 43. The potentiometer tap 43 may be adjusted to set the set-point temperature for the thermostat. Preferably, the adjustable potentiometer tap 43 is mechanically coupled to switch 50 such that this potentiometer adjustment can be done only while switch 50 is closed.

After this potentiometer setting has been completed, switch 50 is released, deenergizing relay coil 49, so that the relay contacts return to the condition shown in FIG. 1. Consequently, the meter-equivalent load resistance circuit 45, 46 now is connected to the potentiometer so that its voltage does not change due to a load change.

The use of direct current on the bridge 13 makes it convenient to reference it against the set-point potentiometer 43, 44 and makes the bridge substantially immune to noise signals which might be picked up by long leads for the thermistor T in remote installations. The DC input to the bridge has virtually the same degree of regulation as the regulated power supply 10, while being isolated from the power supply by the oscillator 11, transformer 12 and rectifiers 25, 26 which together constitute a DC-to-DC converter.

A transistor Q1 in the emitter follower section 15 has its base connected directly to the potentiometer tap 43 so that the potentiometer voltage is applied through the base-emitter path of transistor Q1 to a junction point 60 in the chopper 16. Transistor Q1 has its collector connected directly to the positive terminal of the regulated DC power supply 10. The emitter of Q1 is connected through an emitter-follower resistor 61 to ground.

Another transistor Q2 in the emitter follower section 15 has its base connected directly to the bridge output terminal 35, so that the bridge output voltage is applied through the base-emitter path of transistor Q2 and a resistor 62 to a junction point 63 in the chopper 16. An emitter-follower resistor 64 is connected between junction point 63 and ground. The collector of Q2 is connected directly to the positive terminal of the power supply 10. A capacitor 65 is connected between the base of Q2 and ground.

The emitter follower transistor Q1 and Q2 are matched electrically to one another and they are physically positioned so as to be at the same temperature.

The chopper 16 includes a transistor Q3 having its collector connected through a resistor 66 to the junction point 60 to which the potentiometer voltage is applied. The emitter of Q3 is connected directly to the junction point 63 to which the bridge output voltage is applied. The transformer secondary winding 29 is connected in series with a resistor 67 between the collector and the base of transistor Q3. A capacitor 68 is connected between junction point 60 and ground.

With this arrangement, the chopper is energized or excited through the transformer windings 20 and 29 at the frequency (10 kc.) of oscillator 11. The collector-emitter current through transistor Q3 in a positive half cycle of the excitation source is proportional to a positive voltage difference (if any) between junction points 60 and 63. This positive voltage difference between points 60 and 63 represents a "negative" error signal, which occurs when the output voltage from the bridge 13 is lower than the voltage at the potentiometer tap 43.

The collector of Q3 is connected to the input of the two-stage, high-gain AC amplifier 17, which has a pair of transistors Q4 and Q5 connected to provide the successive stages of amplification. In addition to having high gain, the AC amplifier 17 is substantially free of drift which would be encountered with a high-gain DC amplifier. The collector of Q3 in the chopper is connected to the base of Q4 in the amplifier through a series-connected resistor 69 and capacitor 70. The collector of Q4 is connected to the base of Q5 through a series connected to the base of Q5 through a series connected capacitor 71 and resistor 72.

The collector of Q4 is connected through a resistor 73 to the positive terminal of power supply 10. A resistor 74 is connected between this terminal and the base of Q4. A resistor 75 is connected between the base of Q4 and ground. A resistor 76 and capacitor 77 are connected in parallel with each other between the emitter of Q4 and ground.

Similarly, the collector of Q5 is connected through a resistor 78 to the positive terminal of power supply 10. A resistor 79 is connected between this terminal and the base of Q5. A resistor 80 is connected between the base of Q5 and ground. A resistor 81 and capacitor 82 are connected in parallel with each other between the emitter of Q5 and ground.

The collector of the output stage transistor Q5 in amplifier 17 is connected through a series-connected capacitor 83 and resistor 84 to the base of a first transistor Q6 in the phase discriminator 18, so as to apply to the latter an amplified AC error signal.

A second transistor Q7 in the phase discriminator has its collector connected directly to the collector of Q6 and its emitter connected directly to the emitter of Q6. Both of these emitters are grounded. The collectors of Q6 and Q7 are connected through a resistor 85 to the positive terminal of power supply 10. The base of transistor Q6 is connected through a resistor 86 to this power supply terminal. The base of transistor Q7 is connected through a resistor 87 to ground. The upper end of the transformer primary 20 is connected through a resistor 89 to the base of Q7.

The collectors of Q6 and Q7 are connected through a rectifier 90 to one terminal of a capacitor 91, whose opposite terminal is grounded. A resistor 92 is connected across capacitor 91. The upper terminal of capacitor 91 is connected through a resistor 93 to the base of a driver transistor Q8 controlling the energization of relay coil 19. The emitter of Q8 is grounded. Relay coil 19 is connected between a +14-volt power supply terminal 94 and the collector of Q8. The junction point 63 in the chopper 16 is connected to the collector of Q8 through a resistor 95 and, in series with resistor 95, a parallel-connected rectifier 96 and resistor 97.

The phase discriminator 18 acts as a binary circuit for determining which of the two DC inputs to the chopper 16 is greater.

OPERATION

Resistor 86 biases "on" the first transistor Q6 in the phase discriminator 18. Therefore, in the absence of a negative input signal to its base, Q6 will be conductive.

Figure 2:
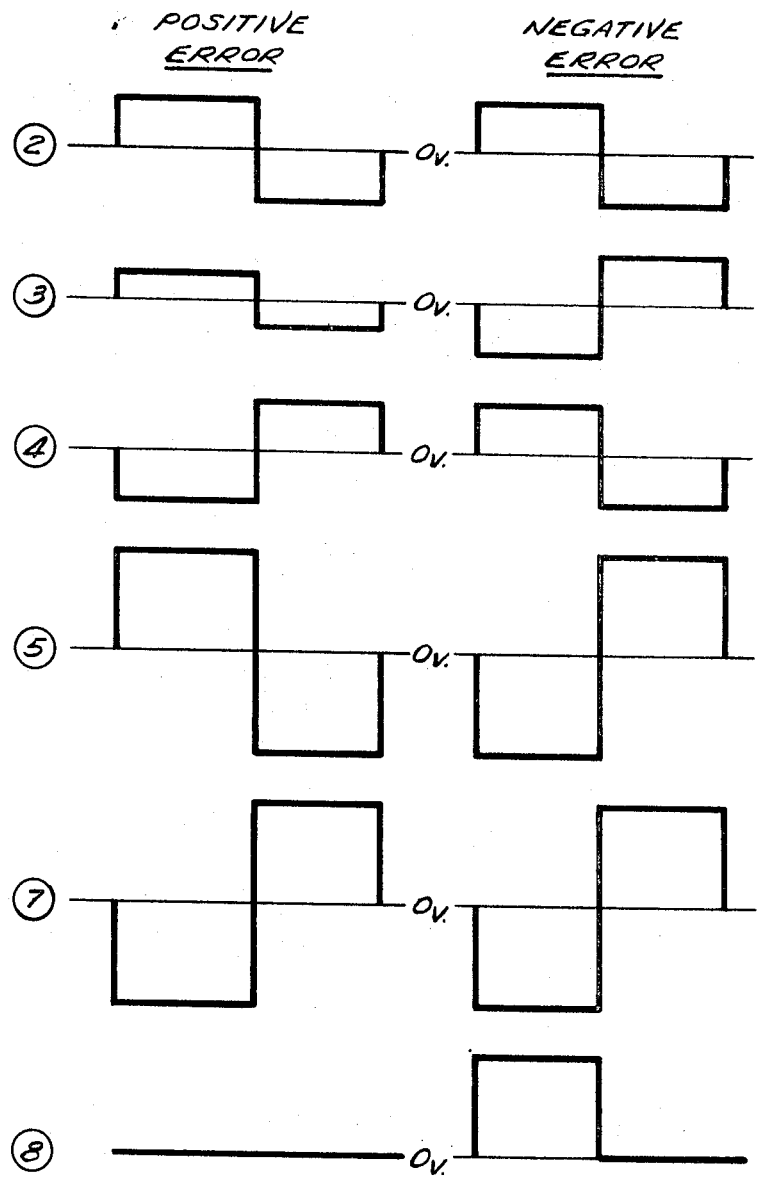
FIG. 2 illustrates the voltages at various test points in the FIG. 1 system under conditions of positive and negative error.

The first column of FIG. 2 shows the test point voltages when there is a positive error—i.e., when the bridge output voltage is higher than the potentiometer voltage. This occurs when the temperature sensed by a thermistor T is higher than the temperature set by potentiometer 43, 44. Under these circumstances, transistor Q3 will not conduct collector-emitter current. Because of the open circuit provided by the collector-emitter path of Q3, the voltage at test point 3 (at the collector of Q3) fluctuates in synchronism with the voltage at test point 2 (at the base of Q3). The voltage at test point 4 (at the collector of Q4) will fluctuate 180° out of phase with the voltage at test point 3, and the voltage at test point 5 (at the collector of Q5) will fluctuate 180° out of phase with the voltage at test point 4.

The voltage at test point 7 (at the upper end of the transformer primary 20) is 180° out of phase with the voltage at test point 2 because of the phase inversion in the transformer. Consequently, in the half cycles when test point 5 is driven positive to turn on transistor Q6 the other transistor Q7 in the phase discriminator will be turned off, and in the other half cycles Q7 will be turned on and Q6 will be turned off. Consequently, Q6 conducts in one half-cycle and Q7 conducts in the next. Since either Q6 or Q7 is conducting at any given time, test point 8 will be at 0 voltage and relay coil 19 will not be energized sufficiently to operate its contacts.

However, a slight current flow through relay coil 19 (not enough to cause it to close its contacts) takes place through a return path to ground provided by resistors 97, 95 and 64. This feedback current increases the voltage at junction point 63 in the chopper 16 by the equivalent of a particular temperature differential, which is determined by the magnitude of resistors 97 and 95. For example, resistor 95 may be adjusted so that the voltage at point 63 is increased by the equivalent of 0.5° F. due to this feedback current above the voltage it would have solely due to the bridge output. Consequently, the *apparent* temperature error (measured by the voltage difference between points 63 and 60) now is 0.5° F. greater than the *actual* temperature error, which is the difference between the temperature set by the potentiometer 43, 44 and the temperature sensed by thermistor T in the bridge.

Consequently, when the temperature sensed by thermistor T falls to the temperature set by the potentiometer, the chopper will continue to see an *apparent* positive error of 0.5° F. This apparent error will not become zero until the *actual* temperature error is 0.5° F. negative (i.e., the temperature sensed by thermistor T is 0.5° F. lower than the temperature set by potentiometer 43,44). When the actual temperature error becomes slightly greater than 0.5° F. negative, the apparent error becomes slightly negative.

The second column of FIG. 2 illustrates the various test point voltages when the apparent temperature error is negative—i.e., when the voltage at terminal 63 is lower than the potentiometer voltage applied to terminal 60. Under these circumstances, during the positive half cycles of the voltage at test point 2 the transistor Q3 will be turned on, causing the voltage at test point 3 to drop. That is, the voltage at test point 3 will fluctuate 180° out of phase with the voltage at test point 2. The voltage at test point 4 will be 180° out of phase with the voltage at test point 3, and the voltage at test point 5 will be 180° out of phase with the voltage at test point 4.

As already explained, the voltage at test point 7 is 180° out of phase with the voltage at test point 2. Under the circumstances now under discussion, the voltage at test point 5 will be in phase with the voltage at test point 7. In the negative half cycles of the voltages at test points 5 and 7, neither Q6 nor Q7 will conduct and therefore the voltage at test point 8 will assume a positive value, charging the capacitor 91. During the positive half cycles of the voltages at test points 5 and 7, both Q6 and Q7 will conduct, causing the voltage at test point 8 to drop to substantially zero.

The voltage on capacitor 91 causes the driver transistor Q8 to turn on, so that full current flows through relay coil 19 and through the collector-emitter path of Q8 to ground. The values of capacitor 91 and resistors 93 and 92 are chosen to prevent Q8 from being turned on in response to noise or brief spurious signals.

With the relay coil 19 now fully energized, the junction point 63 in the chopper 16 is connected to ground through resistor 95, rectifier 96 and the collector-emitter path of Q8. Consequently, the voltage at point 63 is reduced by the equivalent of 0.5° F. This makes the *apparent* negative error (the voltage difference between points 60 and 63) greater by the equivalent of 0.5° F. than the *actual* temperature error which causes the difference between the output voltage from bridge 13 and the voltage at the potentiometer tap 43.

Consequently, even when the *actual* negative error has been reduced to zero, there will still be an *apparent* negative error of 0.5° F. error, so that relay coil 19 will remain fully energized until the thermistor temperature has risen to 0.5° F. above the temperature called for by the potentiometer 43, 44. When the actual temperature error becomes slightly greater than 0.5° F. positive, this will appear as a positive error, causing the circuit to operate as described for positive apparent error.

It will be evident that the present circuit limits the "overshoot" of the set-point temperature to a predetermined value which is independent of the gain of amplifier 17 and independent of the inherent differential of the relay between its fully energized and effectively nonenergized conditions. This temperature differential is determined by the resistance values of resistors 95 and 97, which may be adjusted to provide any desired differential. In the particular example given, this temperature differential is 1.0° F., so that whenever the apparent set-point is reached (either by eliminating the apparent positive error or by eliminating the apparent negative error, there is an abrupt voltage change at point 63 equivalent to 1.0° F. and of a polarity effective to cause the new error condition to be corrected rapidly. That is, the circuit now sees an apparent error which is greater by 0.5° F. than the actual temperature error, and it responds rapidly to correct this artificially high apparent error. Consequently, a desirable "latching" or binary action is provided in the present circuit, so that it responds quickly to an error signal (voltage difference) of low magnitude in a manner to eliminate the error.

While a presently preferred embodiment of this invention has been described in detail and illustrated schematically in the accompanying drawings, it is to be understood that various modifications, omissions and refinements which depart from the disclosed embodiment may be adopted without departing from the spirit and scope of this invention.

I claim:

1. In a system for comparing the magnitude of two DC signals, the combination of:
   an impedance bridge whose output provides one of said signals;
   means for comparing said two DC signals and for providing an AC signal whose magnitude is dependent upon the difference between said two DC signals;
   an AC amplifier for amplifying said AC signal;
   means coupled to the output of said amplifier and operative to determine which of said two DC signals is larger;
   a DC power supply energizing said amplifier and said last-mentioned means; and
   a coupling circuit connected between said power supply and the input of said bridge for energizing the bridge and for isolating the bridge from said power supply.

2. A system according to claim 1, wherein said coupling circuit comprises an oscillator energized by said power supply, a transformer connected to the output of said oscillator, and rectifier means connected between the output of said transformer and the input of said impedance bridge.

3. A system according to claim 2, where said means for comparing the two DC signals and for providing said AC signal comprises a chopper having a pair of output electrodes and a control electrode, said transformer having a secondary winding connected between said control electrode and one of said output electrodes, and means for applying said two DC signals respectively to said output electrodes.

4. A system according to claim 3, wherein said means operative to determine which of said two DC signals is larger comprises a phase discriminator having a pair of transistors connected in parallel with each other, means coupling the output of said AC amplifier to the input of one of said transistors, and means coupling the output of said oscillator to the input of the other of said transistors.

5. A system according to claim 2, wherein said means operative to determine which of said two DC signals is larger comprises a phase discriminator having a pair of transistors connected in parallel with each other, means coupling the output of said AC amplifier to the input of one of said transistors, and means coupling the output of said oscillator to the input of the other of said transistors.

6. In a system for comparing first and second DC signals, the combination of:
   an oscillator;
   a chopper, means operatively coupling the oscillator to the chopper to excite the latter, and means for applying said DC signals to the chopper in opposition to each other to produce an AC output signal from the choppper whose amplitude and phase depend upon the comparative magnitudes of said DC signals and whose frequency is determined by the oscillator;
   an AC amplifier coupled to the output of the chopper for amplifying said AC output signal from the chopper;
   a phase discriminator having first and second electrically conductive switching devices in parallel, means for applying the output of said AC amplifier to the input of said first electrically conductive device to turn the latter on in alternate half cycles of the oscillator, and means operatively coupling the oscillator to the input of said second electrically conductive device to turn the latter on in alternate half cycles of the oscillator.

7. A system according to claim 6, wherein said first and second electrically conductive switching devices are both turned on in the same alternate half cycles of the oscillator when said first DC signal is greater than said second DC signal, and said first and second electrically conductive switching devices are turned on in different alternate half cycles of the oscillator when said first DC signal is less than said second DC signal.

8. A system according to claim 7 and further comprising electrically energizable control means operatively coupled to said phase discriminator to have a first energization state when neither of said switching devices is turned on and a different second energization state when either switching device is turned on.

9. A system according to claim 8 and further comprising a capacitor, and means connecting said capacitor across said switching devices to be charged when neither switching device is turned on and to be discharged when either switching device is turned on.

10. A system according to claim 9, wherein said last-mentioned means comprises a rectifier connected between one side of said switching devices and one terminal of the capacitor, and a resistor connected between said one terminal of the capacitor and the opposite side of said switching device.

11. A system according to claim 9, wherein said control means is a relay coil, and further comprising a driver transistor connected in series with said relay coil to control the latter's energization, and means connecting said capacitor to the input of said driver transistor to turn the latter on when neither switching device is turned on and to turn the driver transistor off when either switching device is turned on.

12. In a system for comparing two DC signals, the combination of:
   a chopper including a transistor having a pair of output electrodes and a control electrode;
   means for applying the two DC signals respectively to said output electrodes;
   an oscillator;
   a transformer coupled to the output of said oscillator and having a secondary winding connected between said control electrode and one of said output electrodes of the transistor in the chopper for energizing the latter;
   a phase discriminator having a pair of semiconductor switching devices connected in parallel;
   means coupling the output of said chopper to the input of one of said semiconductor switching devices in the phase discriminator; and
   means coupling the output of said oscillator to the input of the other of said semiconductor switching devices in the phase discriminator to turn on said other switching device in alternate half cycles of the oscillator output.

13. A system according to claim 12, and further comprising means for biasing on said one semiconductor switching device in the phase discriminator.

14. A system according to claim 13, wherein said means coupling the output of said chopper to the input of said one semiconductor switching device comprises an AC amplifier.

15. In a thermostat system having a Wheatstone bridge including a temperature-sensitive impedance element in one branch thereof, means for applying a DC input to said bridge, a potentiometer having an adjustable contact for determining the set-point temperature, and means for applying a DC voltage to said potentiometer, the improvement which comprises:
   a pair of emitter followers connected respectively to the output of said bridge and to said adjustable contact on the potentiometer to isolate the bridge output voltage and the potentiometer output voltage from each other; and
   means coupled to the outputs of said emitter followers for comparing the bridge output voltage and the potentiometer output voltage.

16. A system according to claim 15, and further comprising means for isolating said DC input to the bridge from the DC voltage applied to said potentiometer.

17. A system according to claim 16, wherein said means for isolating comprises a DC-to-DC converter.

18. In a system for comparing first and second DC signals, the combination of:
   a chopper, means for applying said DC signals to the chopper in opposition to each other to produce an output from the chopper which is dependent upon which of said DC signals is greater;
   binary circuit means operatively coupled to the chopper to produce a first output when the first DC signal is greater than the second DC signal and a different second output when said second DC signal is greater than the first DC signal; and
   a feedback circuit operatively connected between said binary circuit means and the chopper and operative:
   1. when said first DC signal is greater than said second DC signal, to increase said first DC signal by a predetermined increment; and
   2. when said first DC signal is less than said second DC signal, to decrease said first DC signal by a predetermined increment.

19. A system according to claim 18 and further comprising:
   an oscillator operatively coupled to said chopper to energize the latter to provide an AC output which has one phase relationship with respect to the oscillator output when said first DC signal is greater than said second DC signal and has the opposite phase relationship with respect to the oscillator output when said first DC signal is less than said second DC signal; and
   wherein:
   said binary circuit means produces said first output when said AC output from the chopper is in phase with the oscillator output and produces said second output when said AC output from the chopper is out of phase with the oscillator output.

20. A system according to claim 19 and further comprising a semiconductor switching device connected between said binary circuit means and said feedback circuit, and means for turning on said semiconductor switching device in response to one of said outputs from said binary circuit means and for turning off said semiconductor switching device in response to the other of said outputs from said binary circuit means.

21. A system according to claim 20, wherein said feedback circuit comprises a pair of series-connected resistors connected between said semiconductor switching device and the chopper for increasing said first DC signal when said switching device is turned off, and a rectifier connected across one of said resistors and of a polarity to decrease said first DC signal when said switching device is turned on.

22. A system according to claim 19, wherein said binary circuit means comprises a phase discriminator having a pair of semiconductor switching devices in parallel, means for applying the AC output from the chopper to one of said switching devices to turn the latter on in alternate half cycles of said AC output, and means for applying the oscillator output to the other of said switching devices to turn the latter on in alternate half cycles of the oscillator.

23. A system according to claim 22 and further comprising:
a capacitor
means connecting said capacitor across said semiconductor switching devices to be charged when neither of said semiconductor switching devices is turned on and to be discharged when either semiconductor switching device is turned on;
a relay coil having one terminal thereof connected to a power supply; and
a driver transistor connected between the opposite terminal of said relay coil and ground and having its input coupled to said capacitor to be turned on when the capacitor is charged and to be turned off when the capacitor is discharged; and
wherein said feedback circuit comprises a pair of series-connected resistors connected between said opposite terminal of the relay coil and said chopper, and a rectifier connected across one of said resistors and of a polarity to short circuit the latter when said driver transistor is turned on.

24. A thermostat system comprising:
a Wheatstone bridge having a Thermistor in one branch thereof;
a regulated DC power supply;
an oscillator energized by said power supply and having a pair of alternately conductive transistors, each having a grounded current-conducting output electrode and an additional output electrode;
a transformer having a primary winding connected across the output of said oscillator with its opposite ends connected respectively to said additional output electrodes of said alternately conductive transistors in the oscillator, said primary winding of the transformer having a center tap connected to one terminal of said regulated DC power supply, said transformer having a first secondary winding inductively coupled to said primary winding and having a center tap thereon connected to one input terminal of the bridge, a pair of rectifiers connected between the other input terminal of the bridge and the respective opposite ends of said secondary winding;
a potentiometer having an adjustable contact thereon, said potentiometer being connected to said one terminal of said regulated DC power supply;
a pair of emitter followers connected respectively to the bridge output and to the adjustable contact on the potentiometer;
a chopper including a transistor having a control electrode and a pair of output electrodes, means for connecting the outputs of the emitter followers respectively to said output electrodes, said transformer having an additional secondary winding inductively coupled to said primary winding and connected between said control electrode and one of said output electrodes;
an AC amplifier connected to the output of said chopper;
a phase discriminator comprising first and second transistors with their emitters connected directly to each other and their collectors connected directly to each other and having respective base electrodes, a resistor connected between said regulated DC power supply and the base of said first transistor to bias the latter on, means coupling the output of said AC amplifier to the base of said first transistor, means coupling the output of said oscillator to the base of the second transistor to energize the latter in phase with the energization of the primary winding of the transformer;
a capacitor connected to the output of said phase discriminator to be charged when neither said first transistor nor said second transistor is conductive;
a driver transistor connected to said capacitor to be turned on when the latter is charged;
a relay coil connected to said driver transistor to be fully energized when the latter is turned on; and
a resistive feedback circuit connected between said relay coil and the other output electrode of the transistor in the chopper for raising the voltage at said other output electrode when said driver transistor is nonconductive and for lowering the voltage at said other output electrode when said driver transistor is conductive.

25. A thermostat system according to claim 24, wherein said feedback circuit comprises first and second resistors connected in series with each other between the relay coil and said other output electrode of the transistor in the chopper and having ohmic values effective to raise the voltage at said other output electrode by the equivalent of a predetermined temperature differential when said driver transistor is nonconductive, and a rectifier connected in parallel with said second resistor and of a polarity to short circuit the latter when said driver transistor is conductive so as to lower the voltage at said other output electrode by the equivalent of said predetermined temperature differential.

* * * * *